(12) United States Patent
Farrell et al.

(10) Patent No.: US 6,432,472 B1
(45) Date of Patent: Aug. 13, 2002

(54) METHOD OF MAKING SEMICONDUCTOR SUPERCAPACITOR SYSTEM AND ARTICLES PRODUCED THEREFROM

(75) Inventors: Mark Farrell, Collingwood; Harry Eugen Ruda, N. York; Yuichi Masaki, Toronto, all of (CA)

(73) Assignee: Energenius, Inc., Ontario (CA)

(*) Notice: Subject to any disclaimer, the term of this patent is extended or adjusted under 35 U.S.C. 154(b) by 0 days.

(21) Appl. No.: 09/519,264

(22) Filed: Mar. 7, 2000

Related U.S. Application Data

(62) Division of application No. 08/911,716, filed on Aug. 15, 1997.

(51) Int. Cl.$^7$ .............................. B05D 3/02; B05D 5/12
(52) U.S. Cl. .................. 427/79; 427/555; 427/126.3; 427/240; 427/372.2; 427/377; 427/380; 427/430.1; 427/425
(58) Field of Search .................. 427/62, 79, 126.3, 427/229, 240, 372.2, 379, 380, 383.5, 398.4, 425, 430.1, 431, 432, 346, 377, 555

(56) References Cited

U.S. PATENT DOCUMENTS

| | | | |
|---|---|---|---|
| 4,587,041 A | | 5/1986 | Uedaira et al. |
| 4,606,906 A | * | 8/1986 | Ritter et al. ................. 423/598 |
| 5,198,269 A | | 3/1993 | Swartz ......................... 427/226 |
| 5,612,082 A | * | 3/1997 | Azuma et al. ................. 427/96 |

FOREIGN PATENT DOCUMENTS

EP          0 459 575 A       12/1991

OTHER PUBLICATIONS

John Carey, "Science's New Nano Frontier", pp. 101, 102, 06/96.

Wan Y. Shih, et al., "Size Dependence of the ferroelectric transition of small BaTi$_3$ particles: Effect of depolarization", *Physical Review B*, vol. 50, No. 21, (Dec. 1, 1994–I).

Y Babu, et al., "The tetragonal cubic phase transition in mixed perovskie Ba$_{1-\chi}$Ca$_\chi$TiO$_3$ single crystals: EPR evidence of impurity–induced dynamic effects", *J. Phys.*: Condens. Matter 8 (1996) 7847–7856.

Victor W. Day, et al., "Barium Titanium Glycolate: A New Barium Titanate Powder Precursor", *Chem. Mat.*, vol. 8, No. 2(1996).

Hsing–I Hsiang, et al., "Effects of doping with La and Mn on the crystallite growth and phase transition of BaTiO$_3$ powders", *J. of Materials Science* 31 (1996) 2417–2424.

(List continued on next page.)

*Primary Examiner*—Shrive P. Beck
*Assistant Examiner*—Kirsten A. Crockford
(74) *Attorney, Agent, or Firm*—Locke Liddell & Sapp LLP

(57) ABSTRACT

The invention relates to a nanostructured BaTiO$_3$ film, plate or array that has from 1,000 to 10,000 times the storage capacity of conventional capacitors. The barium titanates are of the formula Ba$_a$Ti$_b$O$_c$ wherein a and b are independently between 0.75 and 1.25 and c is 2.5 to about 5.0. The barium titanates may further be doped with a material, "M", selected from Au, is Au, Cu, Ni$_3$Al, Ru or InSn. The resulting titanate may be represented by the formula M$_d$Ba$_a$Ti$_b$O$_c$ wherein d is about 0.01 to 0.25, a is about 0.75 to about 1.25, b is about 0.75 to about 1.25 and c is about 2.5 to about 5.0. X-ray diffraction results illustrate that the crystal structure of the thin films changed from predominantly cubic to tetragonal phase and crystallite size increased with increasing concentration of "M".

36 Claims, 5 Drawing Sheets

OTHER PUBLICATIONS

Hideyuki Emoto, et al., "Sintering and Dielectric Properties of $BaTiO_3$–Ni Composite Ceramics", *J. of the Ceramic Society of Japan*, p. 555 (1992).

H.J. Hwang, et al., "Perovskite–type $BaTiO_3$ ceramics containing particulate SiC", *J. of Materials Science* 31 (1996) 4617–4624.

V. Lehmann, "The Physics of Macropore Formation in Low Doped n–Type Silicon", *J. Electrochem. Soc.*, vol. 140, No. 10, Oct. 1993, pp. 2836–2843.

T. Kanata, et al., "Grain–Size Effects on Dielectric Phase Transition of $BaTiO_3$ Ceramics", Solid State Communications, vol. 62, No. 11, pp. 765–767, 1987.

Dane R. Spearing, et al."Oxygen Displacement through the Ferroelectric Phase Transition of Barium Titanate—High Temperature $^{17}O$ NMR", *J. Amer. Ceram. Soc.* 77 (12) 3263–66(1994).

Tohru Kineri, et al., "Preparation and Optical Properties of Gold–Dispersed $BaTiO_3$ Thin Films by Sol–Gel Process", *SPIE* vol. 2288 Sol–Gel Optics III (1994)/145.

I. Gutzow, "Induced Crystallization of Glass–Forming Systems: a Case of Transient Heterogeneous Nucleation, Part 1.", *Contemp. Phys.* 1980, vol. 21. No. 2 121–137.

K. Irie, et al., "High–Resolution X–Ray Diffraction Study of the Cubic–To–Tetragonal Transition in $BaTiO_3$", *Solid State Communications*, vol. 62, No. 10, pp. 691–693, 1987.

O.Kanert, et al., "Nuclear Magnetic Resonance Study of the Cubic–To–Tetragonal Phase Transition in $BaTiO_3$", *Solid State Communications*, vol. 91, No. 6, pp. 465–469, 1994.

S. Schlag, et al., "Size Driven Phase Transition in Nanocrystalline $BaTiO_3$", *Solid State Communications*, vol. 91, No. 11, pp. 883–887, 1994.

\* cited by examiner

METHOD OF MAKING SEMICONDUCTOR SUPERCAPACITOR SYSTEM AND ARTICLES PRODUCED THEREFROM

This application is a divisional application of U.S. application Ser. No. 08/911,716, filed Aug. 15, 1997.

FIELD OF THE INVENTION

The invention relates to barium titanate thin films and plates and to semiconductor devices such as microminiature, large capacitance capacitors using such films. The invention further relates to barium titanate thin films and plates incorporating a non-reactive electroconductive material, "M". The storage capacity of the thin films and plates of the invention is at least 1 farad/cm$^3$. The invention further relates to a method of preparing the thin films. Such crystalline thin films are characterized by a perovskite structure and have utility in the manufacture of a wide variety of ferroelectric, dielectric, pyroelectric, piezoelectric and electro-optic devices, such as nonvolatile semiconductor memories, thin-film capacitors, pyroelectric (IR) detectors, sensors, surface acoustic wave substrates, optical waveguides, optical memories, spatial light modulators as well as frequency doublers for diode lasers.

BACKGROUND OF THE INVENTION

In the past years, there has been extended efforts in the development of high capacitance electrochemical energy storage devices, especially capacitors and batteries, for use in reduced volumetric areas. Both capacitors and batteries store energy by the separation of positive and negative charges. The need to store greater amounts of energy in a smaller package continues to drive new research.

Barium titanate (BaTiO$_3$) has been studied for use in such microelectronic applications. Such studies have included the different forms of barium titanate including powder, bulk, thin film and multilayer owing to their excellent electronic and optical characteristics including high dielectric constant, transparency in visible wavelength, and high non-linear optical susceptibility.

The use of barium titanates in electric vehicles is further highly desired. Presently, automotive internal combustion engines are increasingly being challenged by environmental concerns, favoring an increased role for electric vehicles. Thus, supercapacitors, as well as batteries, play a major role in this developing market.

Supercapacitors having capacitances in the range of milli-Farads to Farads have suffered from slow charging and discharging cycles in light of their high series resistance (i.e., large RC time constants). In addition, they often rely on corrosive and environmentally unfriendly electrolytes. For instance, the BaTiO$_3$ thin films set forth in T. Hayashi, *Jpn. J. Appl. Phys.*, 32 4092 (1993) have a capacitance unacceptable for use in electric vehicles as well as other industries. Alternative nanosized capacitors are constantly being sought.

Need exists therefore for an electrical energy storage device that combines the desirable features of conventional capacitors yet can store much larger amounts of energy in a smaller package and can be manufactured at reasonable costs.

SUMMARY OF THE INVENTION

The invention relates to a nanostructured BaTiO$_3$ thin film composite that has from 1,000 to 10,000 times the area and storage capacity of conventional BaTiO$_3$ thin films, plates and arrays. The BaTiO$_3$ thin films and plates of the invention can also exhibit a variable discharge rate controlled by optical illumination (pumping).

The barium titanates comprising the coating of the thin films or plates of the invention exhibit dielectric, ferroelectric and/or paraelectric properties. The barium titanates are of the formula Ba$_a$Ti$_b$O$_c$ wherein a and b are independently between 0.75 and 1.25 and c is 2.5 to about 5.0. The thin film composites of the invention exhibit a storage capacity of at least 1 to 100 farads per cubic centimeter.

In another embodiment of the invention, the thin films comprise barium titanate incorporating a non-reactive electroconductive material, "M", capable of forming a microstructure with the thin film. The resulting titanate is of the formula M$_d$Ba$_a$Ti$_b$O$_c$ wherein d is about 0.01 to about 0.25, a is about 0.75 to about 1.25, b is about 0.75 to about 1.25 and c is about 2.5 to about 5.0. Thin film composites containing the incorporated material have a storage capacity of a magnitude between 10 to 1,000 times higher than the storage capacity of the composite materials without incorporated "M" (Ba$_a$Ti$_b$O$_c$).

The thin film composites of the invention have particular applicability in the production of microminiature capacitors.

Lastly, the invention relates to a process of preparing and using a barium titanate film composite, optionally incorporating particles of "M".

DETAILED DESCRIPTION OF PREFERRED EMBODIMENTS

Figure 1:
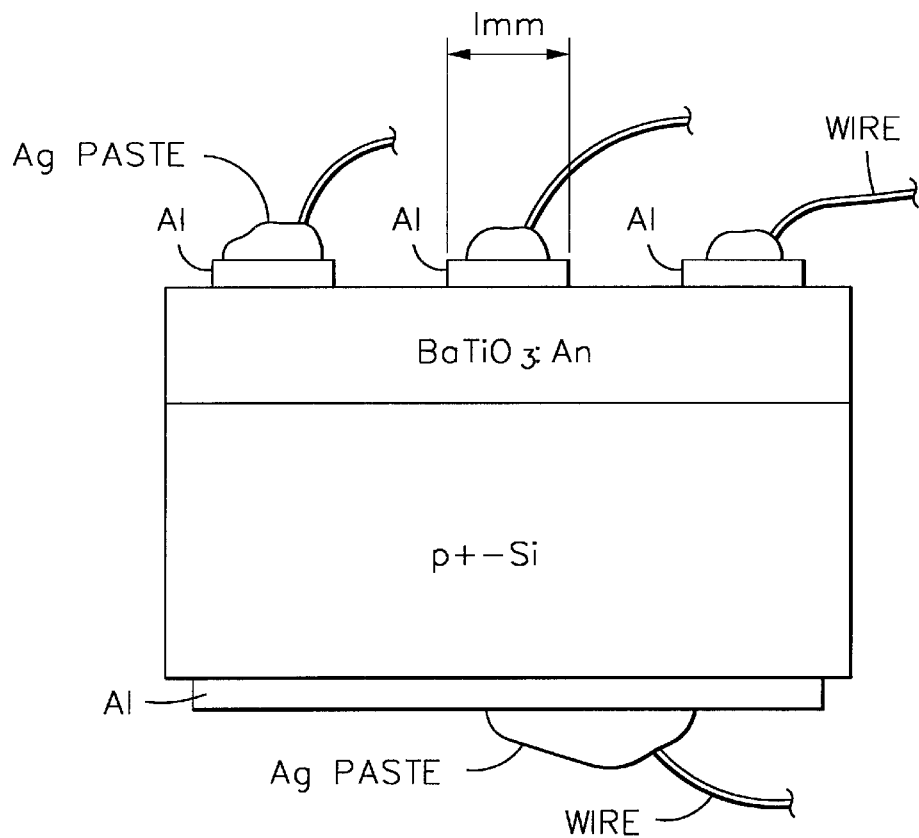
FIG. 1 is a sample preparation of a planar capacitor made by the sol-gel process.

The thin film composites of the invention comprise a thin layer, plate or array (collectively termed "thin film") of the formula Ba$_a$Ti$_b$O$_c$ wherein a and b are independently between 0.75 and 1.25 and c is between about 2.5 and about 5.0 deposited onto a substrate. In a preferred embodiment, both a and b are 1 and c is about 3 of the formula Ba$_a$Ti$_b$O$_c$.

The thin film composites of the invention exhibit an extremely high energy density. As such, thin film composites of the invention have particular applicability in the production of microminiature capacitors.

In addition, the $BaTiO_3$ thin film composites of the invention exhibit a variable discharge rate controlled optically. This permits the capacitance of an article composed of such composites to be tunable for applications where a specific capacitance is desired. In addition, this facilitates designing variable electric series resistance devices for controlled power delivery.

The substrate of the thin film composites of the invention typically are composed of silicon, fused silica, Pt-coated silicon, alumina, sapphire, Pt-coated sapphire, metallized foil, such as a copper foil, or a single crystal $SrTiO_3$ substrate. In addition, the substrate may consist of any electroconductive metal having a melting point of at least 850 C. The substrate should not melt or undergo a phase transition under typical annealing conditions or react or diffuse with the other components of the composite (or laminate as described herein) so as to diminish the properties of the resultant product. Thus, for example, Al would be unsuitable as it would melt at 850° C., a typical annealing temperature.

Suitable for use as the silicon layer are rapidly thermally processed silicon layers crystallized by a lamp based annealling system. Alternatively, silicon whose crystallization has been induced by a laser, such as an excimer laser, may also be used. Alternatively, the substrate may comprise an oxide layer which is rapidly thermally processed using a lamp-based annealing system or laser annealing with a laser such as an excimer or carbon dioxide laser or electron-beam processing. Still further, the substrate of the invention offering increased surface areas may include anisotropically etched substrates as well as locally patterned substrates by laser ablation.

The thin film of the composite comprises an inorganic oxide of the formula $Ba_aTi_bO_c$ wherein a and b are independently between 0.75 and 1.25 and c is between about 2.5 and about 5.0. In preferred embodiment, a and b are approximately 1 and c is about 3.0. In almost preferred embodiment, the inorganic oxides exhibit a tetragonal or perovskite crystalline lattice. During the process described herein, oxygen vacancies and internal stress contribute to the crystallite growth and phase transformation of the oxide. For larger grain sizes of the barium titanate, the material tends to assume a tetragonal crystal structure.

The thin film may further contain a non-reactive component capable of inducing internal strain. Suitable for use as non-reactive components include europium, silicon nitride, boron nitride, magnesium oxide, alumina, tungsten carbide as well as diamond particles. While amounts as high as 50 volume percent of the non-reactive component may be employed, the preferred amount is less than 10 volume percent. Typically, the amount of non-reactive component is between from about 0.01 to about 1 volume percent of the thin film.

The thin film composites exhibit excellent dielectric properties, as evidenced by their energy storage capacity. The thin film composites may further exhibit excellent ferroelectric or paraelectric properties.

The thin film composites of the invention have particular applicability in the production of capacitors. A capacitor containing the thin film composites of the invention having an area approximating three stacked 25 cent pieces renders an equivalent energy density as that of a one quart juice which contains the thin film composites of the prior art.

Such capacitors may be three-dimensional (planar) or three-dimensional (having substrates characterized by trenches, depressions or macropores). The latter enhance the performance of the capacitors. These capacitors provide greater plate area and thus greater capacitance.

Figure 2:
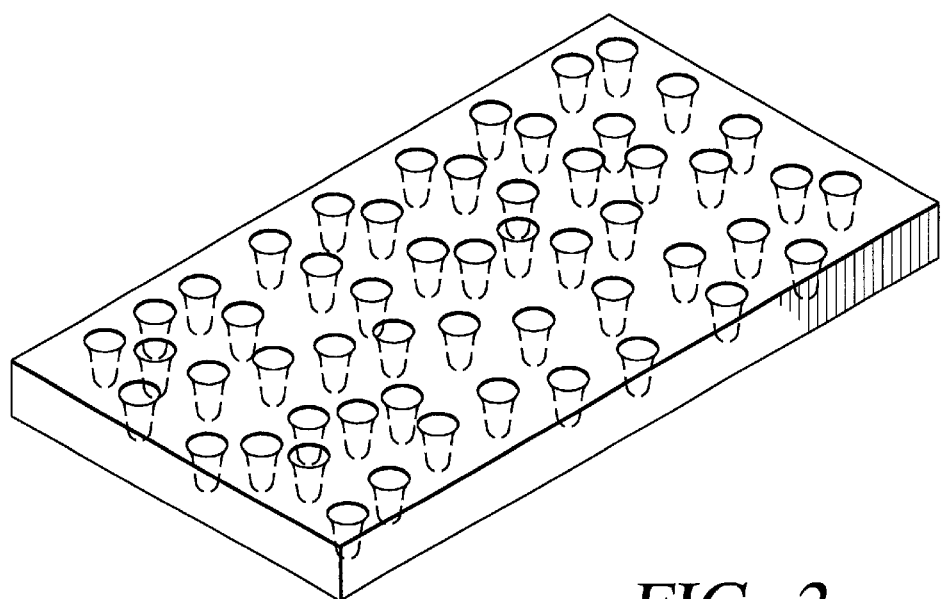
FIG. 2 is a perspective view of the substrate of the thin film composite of the invention having macropores.
Figure 3:
FIG. 3 is a side view of the substrate of FIG. 2.
Figure 4:
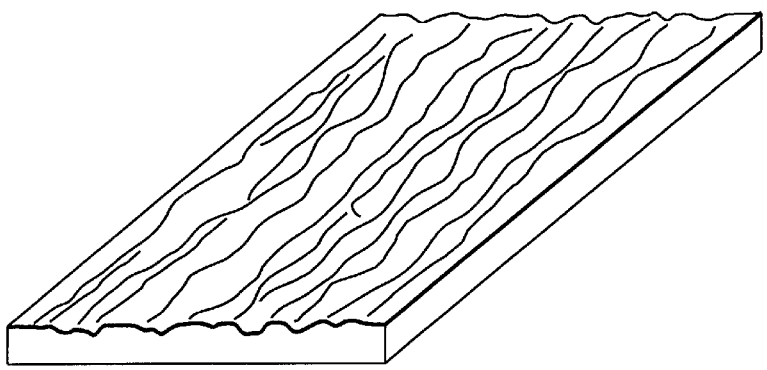
FIG. 4 is a perspective view of the substrate of the thin film composite of the invention having trenches.
Figure 5:
FIG. 5 is a side view of the substrate of FIG. 4.

FIG. 1 is a schematic design of a (planar style) capacitor made by the sol-gel process described below. FIGS. 2–8 show alternative substrate surfaces having increased specific areas between from about 100 to about 10,000 times the surface area of the planar style capacitor of FIG. 1. In FIGS. 2 and 3, discrete macropores define the upper surface of the substrate. In FIGS. 4 and 5, trenches are formed in the substrate. This greatly increases the surface area of the substrate surface.

The dielectric material of the invention is coated over the surface of the pores or depressions of the substrates. Especially desirable results are obtained where the substrate is composed of silicon. Pores or depressions are typically created in the substrate by anodic etching. For instance, where silicon is the substrate, the p+ (or n+) monocrystalline silicon substrate may be subjected to anodic etching.

Figure 6:
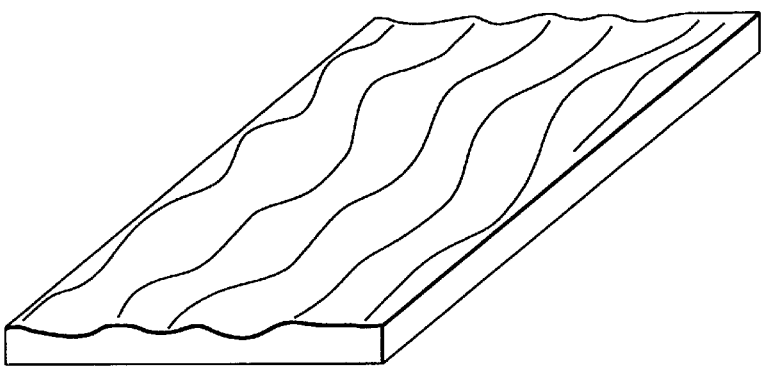
FIG. 6 is a perspective view of the substrate of the thin film composite of the invention having depressions.
Figure 7:
FIG. 7 is a side view of the substrate of FIG. 6.

FIGS. 6 and 7 illustrate the substrate of the thin film composites of the invention wherein the substrate is characterized by depressions. Substrates of the planar capacitor may be formed from a n+ or p+ silicon substrate.

Capacitors in accordance with the invention are those exemplified in FIG. 1. Such substrates may be formed from for example n+ silicon substrate or it may be formed from a polysilicon layer which lines the trench end in the n+ (or p+) silicon substrate. Upper plate and lower plate are electrically insulated with the dielectric layer.

It is important not to fill the depressions, pores or trenches with the dielectric material since this creates high energy pockets and further may generate heat or raise the electric series resistance (ESR) of the capacitor. Rather, it is essential to conformly coat the depressions, pores or trenches.

Figure 8:
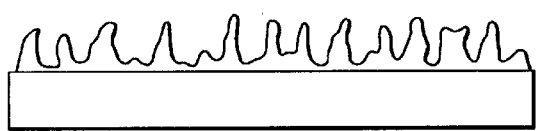
FIG. 8 is a side view of a substrate of the thin film composite of the invention having projections extending from the surface.

The substrate may further be treated by methods defined in the art to exhibit projections which extend from its surface as set forth in FIG. 8.

Anodic etching is performed by submerging the silicon wafer or other substrate in a container of electrolytic solution of hydrofluoric acid and then subjecting the wafer to an electrolytic current. Such procedures are further described in U.S. Pat. No. 5,508,542, herein incorporated by reference. Further, note the techniques set forth in V. Lehmann, W. Honlein, H. Reisinger, H. Wendt and J. Willer, Sol. State Technol., Nov., pp.99–102(1995) directed to macropore substrates, likewise incorporated by reference. Further, as an alternative method, the surface enhancement may also be realized by producing substrate with textured surfaces and incorporating thin film dielectrics on said textured surfaces with an objective to increase the total surface area (by a factor greater than 1 where 1 corresponds to the planar surface) of the substrate.

Such substrates may further include lithographically patterned or anodically etched pores, naturally occurring structures such as those occurring in zeolites and aerogels, anisotropically etched substrates as well as laser ablated locally patterned substrates.

Methods suitable for conformly coating the structured substrates of the invention include procedures known in the art such as physical and/or reactive evaporation, radio-frequency or microwave or electron cyclotron resonance methods including sputtering, chemical vapor deposition including metallorganic chemical vapor deposition, hydride vapor phase deposition, liquid phase epitaxy and electro-epitaxy.

When produced by the methods recited herein, two-dimensional planar thin film composites have a capacitance generally up to 1.0, typically greater than 0.3, most typically between about 0.4 to about 0.5 farads/cm$^3$. When produced by the methods described herein, thin film composites containing an increased specific area substrate surface have a capacitance generally up to 100, typically at least 1, more typically at least 50, most typically at least 100, farads per cubic centimeter. Since capacitance of the composites of the invention is increased exponentially when the area of the substrate is effectively enhanced as in the three-dimensional trench, depression or macroporous configuration, capacitance measurements greater than 1,000 farads/cm$^3$ may be obtained. Capacitance measurements of the thin films in an enhanced area (of the three dimensional structure) have been calculated to be as high as 82.2 farad/cm$^3$ in a 2,000 times enhanced area and an energy density in excess of 13,000 joules/cm$^3$. (Capacitance measurements as recited herein are based on 6 to 10 nF (nanofarads) per 1.3 mm diameter×110 (nanometers) nm thick test samples.)

Crystallization and increased energy storage capacity of the composites is further enhanced by the presence of additive "M" in the thin film. Suitable as additive "M" are those non-reactive electroconductive materials which form a microstructure with the thin film. The resulting titanate may be represented by the formula $M_dBa_aTi_bO_c$ wherein d is about 0.01 to 0.25, a is about 0.75 to about 1.25, b is about 0.75 to about 1.25 and c is about 2.5 to about 5.0. X-ray diffraction of the material with "M" illustrates that a crystal structure which changes from predominantly cubic to tetragonal or perovskite and a crystallite size which increases with increasing concentration of "M" in the coating.

Preferred as "M" are gold, copper, intermetallic compounds such as $Ni_3Al$, Ru and InSn. Particles of "M" should be electroconductive up to the melting point of the substrate and should neither react or diffuse through the substrate. As such, the particles will not degrade the properties of the resulting product. Particles of "M" should preferably be chosen such that they will form a specific microstructure. Preferred results are obtained from particles characterized as accicular precipitates, feathered microstructures, dendritic precipitates or lamellar or eutectic-type structures. Most preferably, "M" is selected so as to cause internal strain in the film or plate that would promote crystallinity with desired crystal structure.

Enhancement of the capacitance with the "M" additive in barium titanate is likely caused by additional internal stress (compression) by particles of "M". Incorporation of particles of "M" further create strong local electric fields around the oxides which likely assists in electron transfer from the barium titanate matrix to the "M" particles. This in turn contributes to weakening of the bonds between the oxygen atoms and the cations in the barium titanates. At high temperatures during annealing, atomic migration is therefore facilitated. Thin films or plates containing the oxides with additives have optimal energy storage capacities. In fact, the range is at least 10 times higher when additions of "M" are employed. Particles of "M" further enhance the dielectric, paraelectric and/or ferroelectric characteristics of the oxides.

Representative of such oxides are those of the formula $M_dBa_aTi_bO_c$ wherein a and b are independently about 0.75 to about 1.25, c is about 2.5 to about 5.0 and d is about 0.01 to 0.25. A particularly preferred inorganic oxide is of the formula $M_dBa_aTi_bO_c$ wherein a and b are both 1, c is 3 and d is 0.01 to 0.25. Especially preferred are those inorganic oxides of the stated formula wherein M is Au.

In general, a deposited inorganic oxide film is only partially crystalline. Since the dielectric properties are enhanced by film crystallinity, a post deposition thermal treatment is often used. This can be accomplished by rapid thermal annealing using quartz halogen lamps, laser-assisted annealing using for example an excimer or carbon dioxide laser, or using electron beam annealing.

The thin film composites of the invention may be prepared by depositing them on an appropriate substrate by such suitable deposition techniques as solgel [M. Kuwabara, S. Takahashi and T. Kuroda, Appl. Phys. Lett., 62, 3372 (1993)], physical and/or reactive evaporation [Y. Yoneda, H. Kasatani, H. Terauchi, Y. Yano, T. Terashima and Y. Bando, J. Phys. Soc. Jap., 62, 1840(1993)], radio-frequency or microwave or electron cyclotron resonance based techniques including sputtering [S. Yamamishi, T. Sakuma, K. Takemura, Y. Miyasaka, Jap. J. Appl. Phys., 30, 2197 (1991)], laser ablation and other laser-based deposition techniques [G. M. Davis and M. C Gower, Appl. Phys. Lett., 55, 112(1989)], chemical vapour deposition including metalorganic chemical vapor deposition [T. Kimura, H. Yamauchi, H. Mashida, H. Kokubun and M. Yamada, Jap. J. Appl. Phys., 33, 5119(1994)], hydride vapor phase deposition, or liquid phase epitaxy and electro-epitaxy.

In the sol-gel process, a non-aqueous solution of titanium alkoxide is reacted with the cationic precursor at the desired stoichiometry and controllably hydrolyzed with a solvent/water solution. A thin, adherent film of the hydrolyzed alkoxide solution (or "sol") is then applied to the substrate by either dip-coating or spin-coating at 1,000 to 3,000 rpm. Multiple coatings may be required for increased film thicknesses; the films are heated to between 3000 to about 600° C. for about 5 to 10 minutes to volatize the organic species and to render the dried "gel" film.

While the majority of the organic matter and water is removed from the films by annealing at 500 C; the barium titanate films are still only partially crystalline.

The product is then annealed for a period of time to remove volatile organic materials. A desirable annealing temperature is about 650° C. for approximately one hour. The product is preferably further annealed to improve the film's crystallinity. The latter step involves heating the film at a rate of about 200° C./hr under dry nitrogen to a final annealing temperature of between 600° C. and 900° C., preferably about 850° C. until the desired crystallization is met.

Preferred as the titanium alkoxide is titanium isopropoxide. The "cationic precursor" is typically the reaction product of a glycol and barium oxide. Typical glycols are ethylene glycol and propylene glycol. The glycol-barium oxide reaction product is typically diluted with an alcohol prior to the addition of the titanium alkoxide. Suitable alcohols for use as diluents include ethanol, isopropyl alcohol and methanol.

During the sol-gel process, the thickness of the composite is a function of the rotation rate and the viscosity of the solution. Typically, the thickness of the composite is about 500 nm at a minimum. The maximum thickness, for instance of a planar thin film composite, may be determined by the number of solgel layers deposited onto the substrate.

An alternative method to the sol-gel method is a spin-coating method. Here, a fine powder of barium oxide is added to the glycol. The reaction is exothermic and the reaction mixture is continuously stirred. The reaction mixture is then diluted with an alkanol, such as 2-propanol. In addition, the titanium alkoxide is then added. To avoid rapid precipitation, the saturated glycol solution is kept at an elevated temperature, preferably about 70° C. The solution is then spun coated onto a suitable substrate. In the first stage of spin coating, the solution is added at approximately 2000 rpm for a short duration. In the second stage, the rotation is increased to about 4000 rpm for a time sufficient to achieve uniform deposition of film. The film is then dried for at a temperature between about 80 to about 100 C, preferably at 90° C. The product is then subjected to a similar annealing stage as described for the sol-gel process.

The dielectric constant of the thin film composites of the invention is between about 20 to about 80. With uniform polycrystalline thin films, the dielectric constants are in the range of about 400 to about 800. For bulk samples, however, the dielectric constants are usually higher, about 1800.

To obtain the desired high values of dielectric constant for the thin films, a ferroelectric, dielectric and/or paraelectric phase transition is induced. The onset of this transition depends on the annealing temperature. Thus, the product is annealed at elevated temperature until crystallization. Generally, the annealing temperature is between from about 600° C. to about 950° C. Higher annealing temperatures tend to increase the average grain sizes in the films (typically from about 20 nm at 650° C. to about 120 nm at 950° C.).

In a second embodiment of the invention, the coating of the substrate is prepared by first dissolving a reaction mixture of alcohol, barium diacetate and titanium alkoxide in ambient atmosphere. The solution of alkanol, acetic acid glycerol is then continuously stirred. Barium acetate is then dissolved in the mixed solution. Titanium alkoxide, such as titanium butoxide is then added to the solution. The solution is continuously stirred for at least a couple of hours. The solution is then diluted with anhydrous alcohol, such as anhydrous methanol, acetic acid and glycerol in the approximate weight ratio of 5:5:1. The solution is then spun coated onto a suitable substrate. The spinning is preferably done at multiple stages. In the first stage, the solution is applied onto the substrate at approximately 2000 rpm for about 10 secs. In the second stage, the solution is applied at a speed of about 4000 rpm for a period of time to achieve uniform deposition. Generally, this is for about ten seconds.

Alternatively, the substrate may be dipped into the solution at an average speed of about 10 to about 15 cm/min, preferably about 11.5 cm/min. The coating is then dried onto the substrate at a temperature of from about 300° C. to about 500° C.; typically films are first dried at 200° C. for 2 hrs, and then baked at 400° C. for about 20 mins to remove volatile organic materials. Films are then annealed at the temperature range of about 600° C. to about 800° C. to improve crystallinity. Typically the duration of annealing is about one hour.

It is most preferably that all reactants used in each of the alternative processes be of high purity. Generally, the level of purity is greater than 90%, preferably greater than 95%, most preferably greater than 99%. In addition, it is preferred that the individual steps of the invention be conducted in a nitrogen-free atmosphere.

Inorganic oxides of the formula $Au_dB_aTi_bO_c$ wherein a and b are independently about 0.75 to about 1.25, c is about 2.5 to about 5.0 and d is about 0.01 to 0.25 may be produced in accordance with any of the above procedures with the addition of an aqueous solution of M to the titanium containing solution prior to the latter being deposited onto the substrate. Where M is Au, an aqueous solution of $HAuCl_4$ is preferably added to the solution containing the titanium. The $HAuCl_4$ is preferably diluted with an alcohol prior to the addition of the $HAuCl_4$ to the other reactants.

In a typical process, a mixed solution of alkanol, such as methanol or ethanol, acetic acid and glycerol is mixed with continuous stirring at room temperature. Suitable mixing is achieved in about one hour. Barium acetate is then dissolved in the mixed solution. Titanium alkoxide, such as titanium butoxide, is added to the solution. The resulting solution is then stirred, typically for an additional two hours. $HMCl_4.xH_2O$, such as $HAuCl_4.3H_2O$ is then added to the solution. The solution is then diluted with an alkanol, such as methanol or ethanol, prior to spin coating. The solution is then spun coated onto a suitable substrate for a suitable time to achieve uniform deposition of coating. Typically, the spin coating proceeds through two stages. In the first stage, the solution is spin coated at a speed of about 2000 rpm, typically for about 10 seconds. In the second stage, the solution is spin coated onto the substrate at a speed of approximately 4000 rpm, typically for about 10 secs.

Alternatively, substrates may be dipped into the solution for coating of the thin film at an average speed of about 10 to about 15 cm/min, preferably about 11.5 cm/min. The thin film is then dried onto the substrate at a temperature of from about 300° C. to about 500° C.; typically films are first dried at approximately 200° C. for about 2 hours, and then baked at about 400° C. for about 20 minutes to remove volatile organic materials. The films are then annealed at a temperature range of about 600° C. to about 800° C. for a sufficient period of time to improve crystallinity. Typically, the annealing time is for about one hour.

The purity of $HMCl_4$ added to the titanium isopropoxide/reaction product is at least 90, preferably 95, most preferably 99, per cent.

Thin films of $Ba_aTi_bO_c$ and $M_dBa_aTi_bO_c$ may further be prepared by mixing titanium tetraacetate with an aqueous solution of alcohol. When $M_dBa_aTi_bO_c$ is the desired oxide, particles of M may be present in the aqueous alcohol solution. The $Ba_aTi_bO_c$ or $M_dBa_aTi_bO_c$ may be prepared by reacting barium diacetate and acetic acid in the presence of an alcohol and a glycol. To the resultant solution is added titanium tetraacetate, and the aqueous alcohol solution optionally containing M. The resultant solution is then spun onto a substrate. Spinning may be effectuated at speeds approximating 500 rpm. The speeds may be increased to about 1,000 to about 4,000 rpm until a uniform distribution is obtained. The coated substrate is then dried by heating to a temperature of from about 150° C. to about 200° C. In a final heating step, the product may be heated at a temperature between about 360° C. to about 400° C. to remove volatile organic materials. The product is then annealed at a temperature of about 500° C. to about 850° C. until crystallization is complete. The product is then isolated. As in the procedure recited above, the alternative procedure uses reactants of high purity and is conducted in a dry nitrogen-rich atmosphere.

Additives of "M" in the process enhance crystallization in the resulting thin films. In addition, they induce the phase transition of the barium titanate from cubic to tetragonal structure. The enhancement of the particles of M in the crystallization process can be attributed to the structure of the thin film as well as by the substitutional additives, oxidation of metal particles, liquid-phase mediation, internal stress, electric-field, and heterogeneous nucleation.

In a preferred embodiment, the composites are employed in the production of capacitors wherein the thin film composites are interposed between two substrate layers having a planar face. The substrate layers may be composed of various materials such as ceramic, glass, plastic or metal or metallized foil, such as copper foil. Preferably, the substrate layers are thin, flat, relatively stiff and have a planar face.

The substrate layer(s) can be nonconductive, but in the case where the substrate is conductive it also can function as a current collector. Especially preferred results are obtained where the top and/or bottom substrate layer of the capacitor is selected from silicon, copper, gold, aluminum, nickel or another electroconductive material having a melting point of at least 850° C.

Such capacitors may be prepared by depositing the thin film composite of the invention onto the substrate layer having planar face. The thin film composites may be deposited onto a substrate by conventional techniques, such as dip coating, spin coating, doctor blading or spray coating. The resulting structure may then be annealed by conventional means such as thermal annealing, rapid thermal annealing, laser annealing or electron beam annealing. Annealing proceeds at a temperature of from about 500° C. to about 850° C. Generally, the annealing conditions will be selected to increase the grain size of the substrate comprising the thin film composite as well as to induce a textured condition in the substrate. Subsequent annealing, in turn, enhances the texture and degree of crystallinity of the barium titanate thin film.

The composites of the invention have particular applicability as silicon nanostructure based supercapacitors. Since they are of nano size, the composites of the invention provide a portable power source. Primary applications of the invention are in DC voltage energy storage systems such as batteries for watches, cellular phones, portable entertainment equipment, electric vehicles. In particular, power sources to electric vehicles may be provided from a single battery which may be charged in a matter of minutes.

Further, the thin films exhibit ferroelectric properties and thus the composites of the invention find particular utility as electrical energy storage devices as well as non-volatile field effect transistors. The latter preferably contains a semiconductor as substrate. A buffer layer typically separates the thin film composite from the semiconductor substrate.

Conventional means may be electrically coupled to the dielectric and the planar substrate layers forming the sandwich with the dielectric.

In addition to high energy storage materials, the thin film composites of the invention may be used in energy transmission and/or sensing systems. Particular applicability of the invention is in portable radios, stereos, personal entertainment equipment, toys, flashlights, cellular phones as well as electric vehicles including but not limited to automobiles, boats, ships, submarines, motorcycles, forklifts, wheelchairs and airplanes. In addition, the invention may be employed in the production of aerospace systems such as rockets, satellites, lasers, orbiting platforms and defense systems.

Conventional MOS capacitors based on $SiO_2$ have dielectric constants near about 2 compared with capacitors comprising the thin films or plates of the invention which have about 30–40 times higher values and thus capacitances 30–40 times higher. In fact, the amount of energy stored in a battery or capacitor which contains the dielectric of the prior art and having a volume of 1000 ounces may be stored in a volume the size of a one ounce container when the barium titanate of the invention is used as dielectric. A capacitance of 40 millifarads (mf) per cubic centimeter has been obtained for a typical thin film cell using the barium titanates of the invention and with a planar structure (superficial area increase of 1). A superficial area increase of 1,000 to 10,000 would render a cell with a storage capacity of 40 to 400 farads/cm$^3$.

The composites of the invention may be used in the production of a number of semiconductor applications, especially Dynamic Random Access Memories (DRAM), Static Random Access Memories (SRAM) as well Metal Oxide Semiconductor (MOS) capacitors in Ultra Large Scale Integrated (ULSI) circuits. Large amounts of charge can be stored for a given gate voltage swing or logic pulse in light of the dielectric properties of the thin films. In particular, barium titanate capacitors of the invention significantly reduce the cost of manufacturing advanced DRAMs by reducing the complexity of the capacitor cell in 1-Gb DRAMs.

Large scale integration of DRAMs further require dielectrics with low leakage currents and low defect densities. Although multilayer silicon oxide-nitride-oxide (ONO) represent the present state of the art, charge trapping is an inevitable feature of such systems. However, in DRAMs, the device stability is seriously affected by the associated shifts in the flatband potential and threshold voltage. With the higher value single layer dielectrics of the invention, such problems are alleviated. The thin film composites of the invention exhibit very low leakage exhibited by tan $\delta$ values (under 0.1%) and a Curie-Von Schweidler n value of about unity to 1.1. This permits long term storage capabilities.

Thus, the invention may be used to reduce capacitor and/or battery size for greater energy containment in equivalent volume, up to 1000 times the energy density over existing commercially available systems. The supercapacitors may be used in the isolation of DC potential delivery/harnessing systems where it is employed as a mediator in parallel configurations.

Secondary applications include AC delivery from a DC to AC converter to supply 120/240 vac to residences and businesses.

The invention may further be applied as a reasonable sized high current, short duration, discharge device for powering other devices that have short term, high energy requirements.

In fact, energy densities on the order of 1,000 to 10,000 times the energy density of a normal lead acid battery and charging rate of a conventional capacitor would be feasible with the present materials.

The supercapacitors have particular applicability in the semiconductor industry especially in the construction and manufacturing of integrated circuits. In addition, it may be used by hybrid semiconductor manufacturers using discrete dielectrics and storage systems on or off the hybrid template. It may be further be used by printed circuit board manufacturers for the purposes of embedding large value capacitance in multilayer boards. Still further it may be used by (i.) communications industry in portable, cellular phones and critical systems power backup (such as emergency generators); (ii.) military sector usage in advanced guidance systems, controls, targeting and tracking systems or any application requiring backup power sources or highly condensed electronics; or (iii.) electric vehicles, land, sea, air and/or space as the primary, backup or initiating power source.

EXAMPLES

Example 1

One mol of $Ba(CH_3COO)_2$ was dissolved in a mixed solution of 20 mol $C_2H_5OH$, 25 mol $CH_3COOH$ and 1 mol gylcerol and then the solution was stirred for 2 hours. After stirring, 1 mol of $Ti[O(CH_2)_3CH_3]_4$ was added to the solution followed by stirring for 2 hours. Then, a mixed solution of $HAuCl_4 \cdot 3H_2O$ with 0.05 mol and 4.1 mol of $C_2H_5OH$ was added to the solution. Finally, to form a Au-dispersed $BaTiO_3$ film, the final solution was spin-coated onto two different kinds of p-type Si (p=5~7 Ωcm) wafers which have been dipped into hydrofluoric acid (HF) to remove the native Si oxide films prior to spin-coating. The conditions for the spin-coating were 2000 rpm for 45 sec. After spin-coating on the solution, both of the samples were annealed first at 175° C. for 1 hour in $N_2$ atmosphere, and then at 400° C. for 1 hour. The final annealing termperatures were 700° C. for 1 hour for one sample and 850° C. for 1 hour in air for the other sample.

A metal-insulator-semiconductor or MIS structure was fabricated for the capacitance measurements as shown in FIG. 1. Prior to evaporation of the lower (backside) aluminum electrode the samples were immersed into HF to remove the native silicon oxide. After evaporation they were annealed at 450° C. to ensure good ohmic contact with the silicon substrate. The etch rate of $BaTiO_3$ films for the sample annealed at 850° C. during the fabrication process of the MIS structure was much lower (slower) than that for the sample annealed at 700° C. This means that the former film should be much denser than the latter.

Example 2

One mol of $Ba(CH_3COO)_2$ was dissolved in a mixed solution of 20 mol $C_2H_5OH$, 25 mol $CH_3COOH$ and 1 mol glycerol. The solution was then stirred for 2 hours. After stirring, 1 mol of $Ti[O(CH_2)_3CH_3]_4$ was added to the solution followed by stirring for 2 hours. A mixed solution with various specified quantities of $HAuCl_4 \cdot 3H_2O$ and 1 mol of $C_2H_5OH$ was then added. To form Au-dispersed $BaTiO_3$films, the solution was spin-coated onto two different kinds of p-type Si (p=0.5~0.7 ohms/cm and 5~7 ohms/ cm) wafers which had been dipped into hydrofluoric acid prior to spin-coating to remove the native Si oxide. The conditions for the spin coating were 2000 rpm for 45 sec. After spin-coating the solution, all the samples were annealed at 170° C. for 1 hour in a nitrogen atmosphere, followed by two steps of successive annealing of 400° C. for 1 hour and 700° C. for 1 hour in air. The thickness of all the samples prepared in this way were around 110 nm as measured by a surface profilemeter and by using cross-sectional Field-Emission scanning electron microscopy.

Both the highest annealing temperature (700° C.) and thickness of the films (110 nm) were fixed. Only the gold concentration in the solution, and hence in the films, was varied. Table 1 summarizes the sample preparation conditions. Structural evaluation of the films was carried out using x-ray diffraction (XRD) on a Siemens D5000 system.

Figure 9:
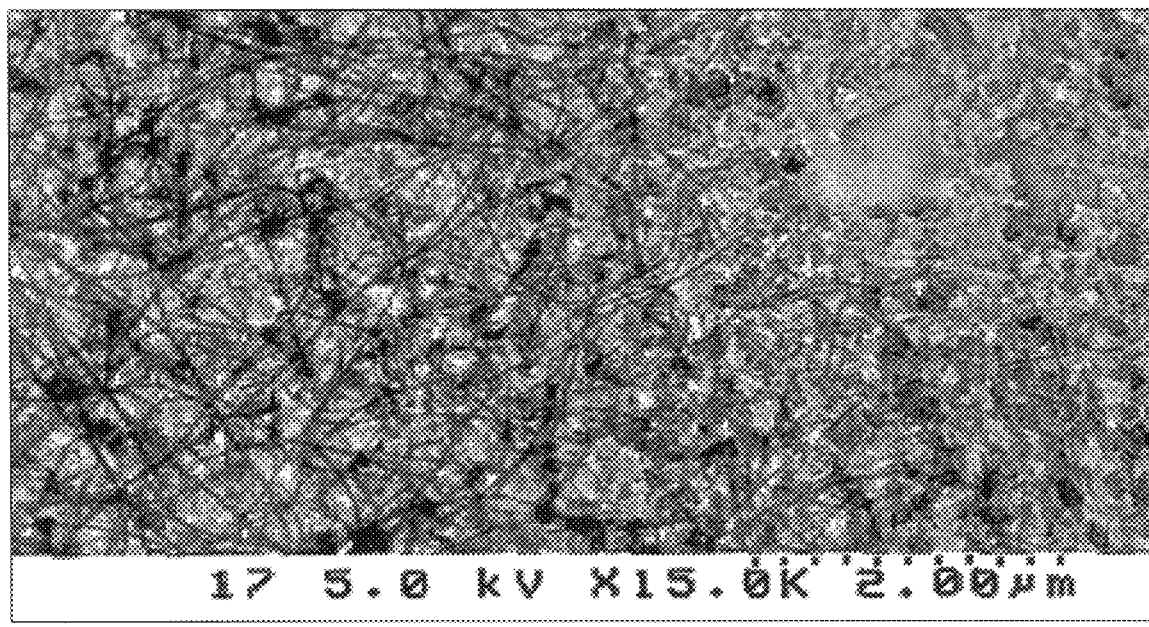
FIG. 9 is an internal structure of a thin film composite of the invention as seen using a scanning electron microscope.

FIG. 9 shows the XRD results for the four different samples. In the sample with no gold (#1107A), only a small and broad peak is observed around 44.5°, which can be assigned to the (200) plane of cubic $BaTiO_3$. On the other hand, for the sample with the highest gold concentration (#1107B), two sharp peaks at 22.30° and 45.50° were observed. These two peaks are due to the reflections from the (100) and (200) planes of $BaTiO_3$; the latter peak was in fact not from the cubic phase but the tetragonal phase (or perovskite) of $BaTiO_3$. Also from the XRD pattern of sample #1107B, it is clear that the film has a larger average grain size and is highly oriented along the [111] direction, in spite of the use of a (100) Si wafer as a substrate which has a substantially different crystal structure. By adding a small amount of gold (0.005 mols, #1107D) to the $BaTiO_3$ film, the peak intensity for the (200) plane of cubic $BaTiO_3$ increases, but the peak is still weak and broad. The cubic (200) peak intensity appears to weaken with further additions of gold (0.01 mols, #1107C). From the above results, it may be concluded that adding gold to undoped $BaTiO_3$ enhances crystallization in these films.

TABLE I

Summary of the sample preparation conditions

| Sample Code | 1107A | 1107B | 1107C | 1107D |
|---|---|---|---|---|
| $HAuCl_4 \cdot 3H_2O$ Content (mol) per 1 mol $Ba(CH_3COO)_2$ | 0 | 0.05 | 0.01 | 0.005 |
| Annealing Temperature (° C.) | 700 | 700 | 700 | 700 |
| Thickness (nm) | 110 | 110 | 110 | 110 |

Figure 10:
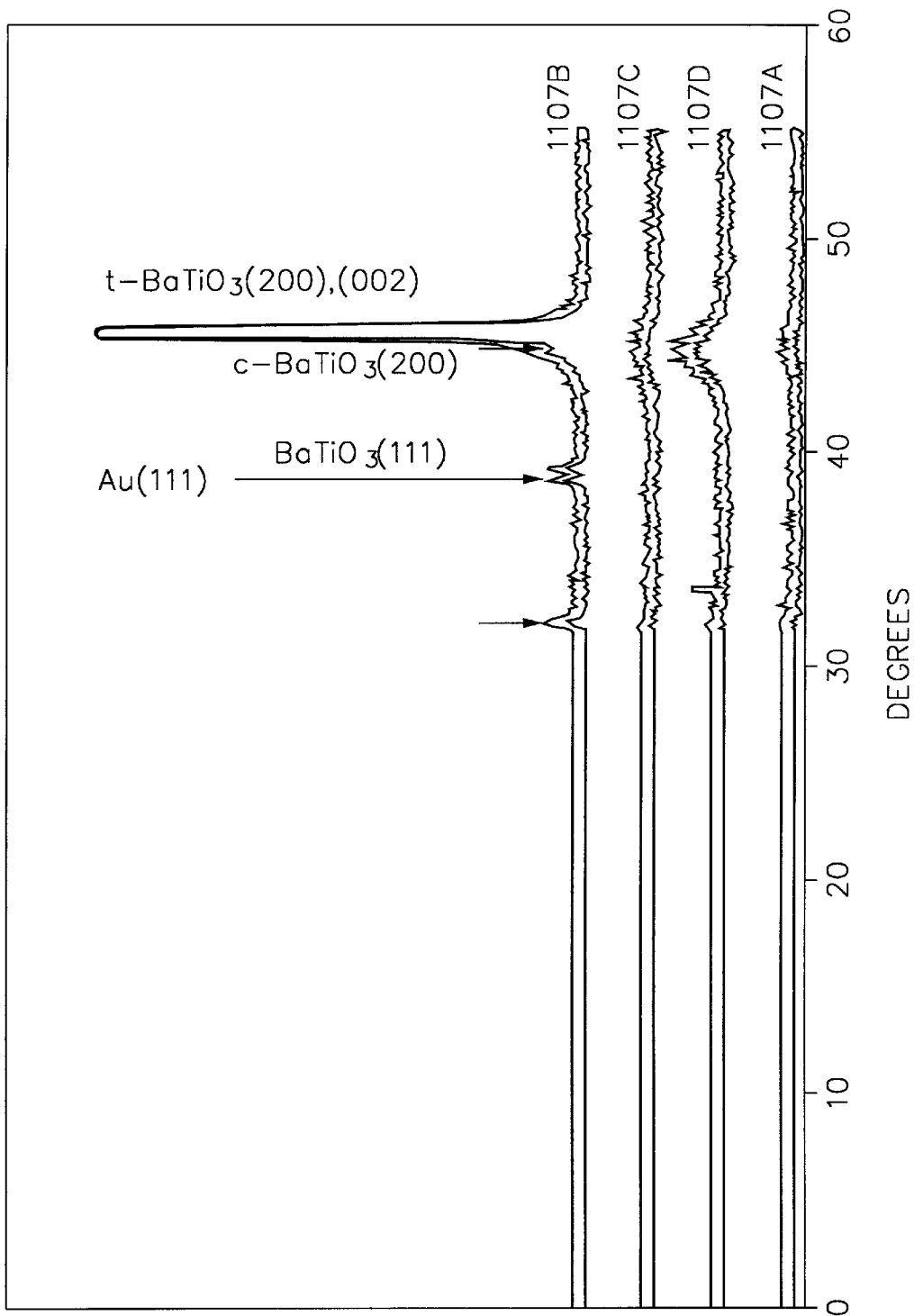
FIG. 10 is the x-ray diffraction pattern of a barium titanate composite prepared in accordance with the invention.

FIG. 10 is the X-ray diffraction pattern of the four samples above. The Figure shows a phase change from cubic to tetragonal and grain growth with increasing Au concentration.

Example 3

Figure 11:
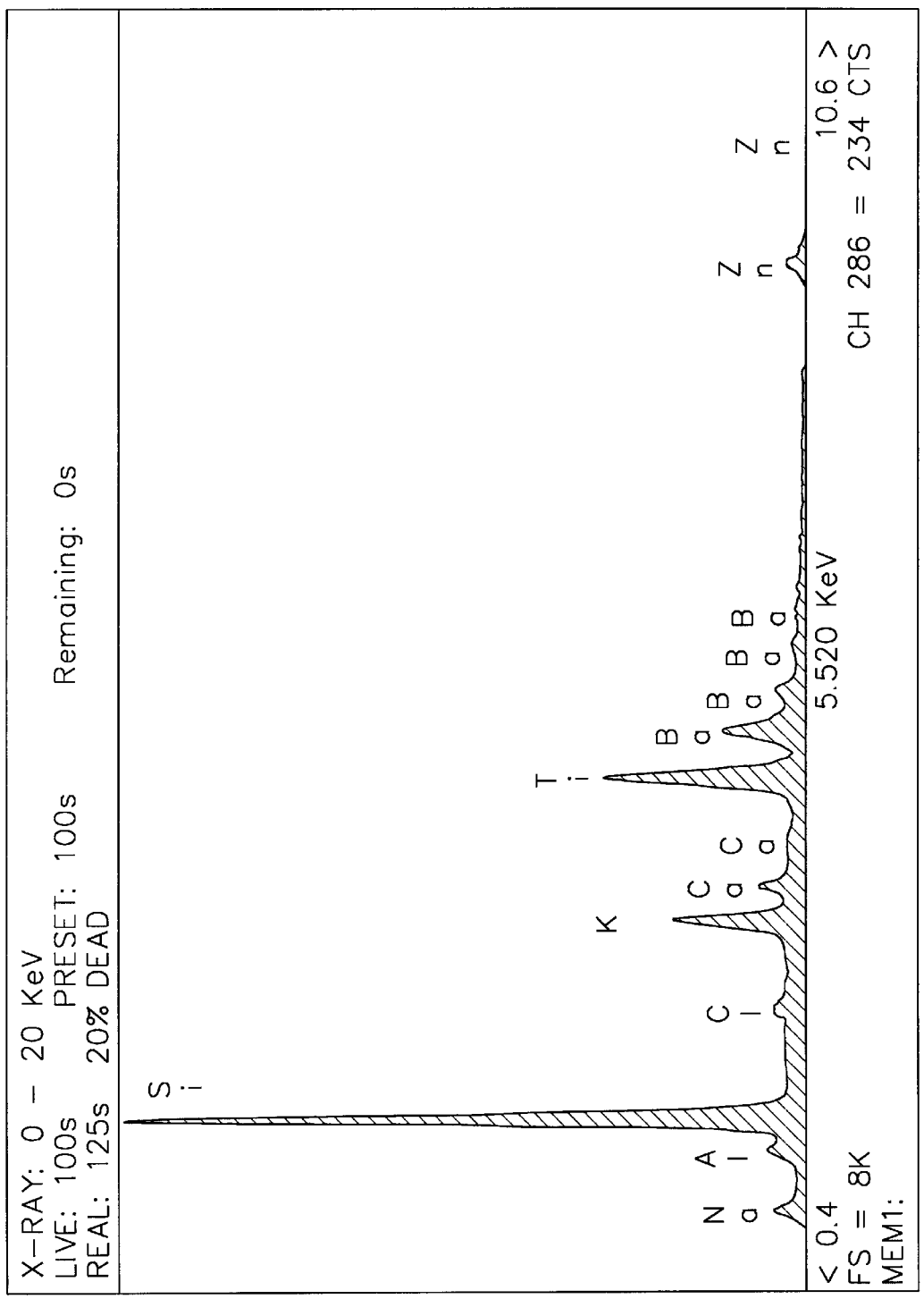
FIG. 11 illustrates the morphology of a nanocrystalline BaTiO$_3$ film composite prepared in accordance with the invention.

Barium titanate glycolate was prepared as follows. Six grams of barium oxide (99.5% purity) fine powder was added to 30 ml of ethylene glycol using vigorous stirring. The reaction was exothermic, and the reaction mixture was :continuously stirred over 30 minutes. The reaction mixture was then dilute with 40 ml of2 propanol. In addition, 9.0 ml of titanium isopropoxide was added with vigorous stirring. To avoid rapid precipitation the saturated ethylene glycol solution as kept hot (70° C.). The morphology of the nanocrystalline $BaTiO_3$ film prepared is set forth in FIG. 11 after annealing at 650° C. for 1 hour. The coated samples were then dried under vacuum at 90° C. for 2 hours. They were then heated at a rate of 200° C./hour under dry flowing air up to the temperatures required to initiate calcination of the films, i.e., between 600 and 900° C. Elemental analysis using energy dispersive X-ray analysis on a scanning electron microscope showed that these films were $BaTiO_3$ films. The spectra also showed the presence of elements from the glass substrate and Al contacts (Si, K, Na, and Al) and some impurities coming from the solution (Zn and Ca). Rapid thermal annealing of the films at 800° C. can be used to improve the crystallinity of the films and to increase the dielectric constant from about 20 to about 80.

Various modifications may be made in the nature, composition, operation and arrangement of the various elements, steps and procedures described herein without departing from the spirit and scope of the invention as defined in the following claims.

What is claimed is:

1. A method of preparing a thin film composite of a substrate and a thin film, wherein the thin film compnses bahurn titanate of the fonula $Ba_aTi_bO_c$ and wherein the thin film composite enables a storage capacity of at least 0.3 farad/cm$^3$, which comprises:

(A) applying onto a substrate a $Ba_aTi_bO_c$ coating wherein a and b are independently between from about 0.75 to about 1.25 and c is from about from 2.5 to 5.0, wherein the $Ba_aTi_bO_c$ coating is prepared in a nitrogen-rich atmosphere by blending a reaction mixture of alcohol, barium diacetate and titanium alkoxide; and then admixing the resulting product with acetyl acetone and a weak acid; wherein the alcohol, barium diacetate, titanium alkoxide weak acid and acetyl acetone have a purity of at least 90%;

(B) drying the coated substrate at a temperature of from about 300° C. to about 500° C.;

(C) annealing the dried coated substrate at a temperature from about 600° C. to about 800° C. until crystallization wherein the substrate and $Ba_aTi_bO_c$ are of high purity and further wherein steps A–C are conducted in a nitrogen-rich environment.

2. The method of claim 1, which further comprises admixing with the $Ba_aTi_bO_c$, prior to step A, a non-reactive solution containing Au, Cu, $Ni_3Al$, Ru or InSn, wherein the purity of the aqueous solution is at least 90%.

3. The method of claim 1, wherein the substrate is silicon, alumina, sapphire, or an electroconductive metal having a melting point of at least 850° C.

4. The thin film composite of claim 3, wherein the substrate is silicon or Pt-coated silicon.

5. The method of claim 1, wherein the substrate contains lithographically patterned or anodically etched pores, zeolites, or aeorogels.

6. The method of claim 1, wherein the substrate is anisotropically etched or locally patterned by laser ablation.

7. A method of preparing a thin film composite of $Ba_aTi_bO_c$ wherein a and b are independently between about 0.75 and about 1.25 and c is about 2.5 to about 5.0 which comprises:

A. dissolving a reaction mixture of alcohol, barium diacetate and titanium alkoxide in ambient atmosphere;

B. forming an aqueous solution comprising the product of step A., weak acid and acetyl acetone;

C. dipping a substrate, into the solution of step B.;

D. drying the coating of step C at a temperature of from about 300° C. to about 500° C.;

E. annealing the product of step D at a temperature of from about 600° C. to about 800° C. until crystallization;

wherein the alcohol, barium diacetate, titanium alkoxide, weak acid and acetyl acetone have a purity of at least 95% and further wherein steps A through E are conducted in a dry nitrogen-rich atmosphere.

8. The method of claim 7, wherein the titanium alkoxide is titanium isobutoxide or titanium isoproxide.

9. The method of claim 7, wherein the weak acid is acetic acid.

10. The method of claim 7, which further comprises adding a non-reactive solution containing Au, Cu. $Ni_3Al$, Ru or InSn to the product of step B prior to deposition of the substrate and further wherein the purity of the aqueous solution is at least 95%.

11. The method of claim 10, wherein the aqueous solution contains $HAuCl_4$.

12. The method of claim 7, wherein the substrate is silicon, alumina, saphire, or an electroconductive metal having a melting point of at least 850° C.

13. The method of claim 12, wherein the substrate is silicon or Pt-coated silicon.

14. The method of claim 7, wherein the substrate contains lithographically patterned or anodically etched pores, zeolites, or aeorogels.

15. The method of claim 7, wherein the substrate is anisotropically etched or locally patterned by laser ablation.

16. A method of preparing a thin film composite comprising $M_dBa_aTi_bO_c$ wherein "M" is Au, Cu, $Ni_3Al$, Ru or InSn, a and b are independently between about 0.75 to about 1.25, c is about 2.5 to about 5.0, and d is about 0.01 to 0.25, which comprises:

A. reacting barium diacetate and acetic acid in the presence of an alcohol and a glycol;

B. mixing titanium tetraacetate with the mixture of step A and adding thereto an aqueous solution containing "M";

C. spinning the solution of step B onto a substrate at 500 rpm and then at about 1,000 to about 4,000 rpm until a uniform distribution is obtained;

D. drying the coated substrate of step C by heating at about 150° C. to about 200° C.;

E. heating the product of step D at a temperature between about 360° C. to about 400° C. to remove volatile organic material therefrom;

F. annealing the product of step E at about 500° C. to about 850° C. until crystallization is complete wherein steps A through F are optionally conducted in a nitrogen-rich atmosphere.

17. The method of claim 16, wherein the aqueous solution containing "M" is a solution of $HAuCl_4$ in alcohol.

18. The method of claim 16, wherein the substrate is silicon, alumina, sapphire, or an electroconductive metal having a melting point of at least 850° C.

19. The method of claim 18, wherein the substrate is silicon or Pt-coated silicon.

20. The method of claim 16, wherein the substrate contains lithographically patterned or anodically etched pores, zeolites, or aeorogels.

21. The method of claim 16, wherein the substrate is anisotropically etched or locally patterned by laser ablation.

22. A method of preparing a thin film composite of a substrate and a thin filhn, wherein the thin film comprises $M_dBa_aTi_bO_c$ and wherein the thin film composite enables a storage capacity of at least 0.3 farad/cm$^3$, wherein "M" is Au, Cu, $Ni_3Al$, Ru or InSn, a and b are independently between about 0.75 and about 1.25, c is about 2.5 to about 5.0 and d is about 0.01 to 0.25, which comprises:

A. reacting a glycol with barium oxide under agitation;

B. diluting the reaction mixture of step a with an alcohol;

C. adding titanium alkoxide to the reaction product of step B with agitation;

D. adding an aqueous solution containing "M" in an alcohol to the product of step C;

E. depositing the mixture of step D. onto a substrate;

F. drying the coating of step E at a temperature of form about 150° C. to about 200° C.;

G. annealing the product of step F. at a temperature of from about 600° C. to about 800° C. until crystallization;

wherein the glycol, barium oxide, alcohol titanium alkoxide and solution containing "M" have a purity of at least 95% and further wherein steps A. through G. are conducted in a dry nitrogen-rich atmosphere.

23. The method of claim 22, wherein the glycol is ethylene glycol.

24. The method of claim 22, wherein "M" is a solution of $HAuCl_4$ in alcohol.

25. The method of claim 22, wherein the mixture of step D. is deposited onto the substrate by dip coating, spin coating, doctor blading or spray coating.

26. The method of claim 22, wherein the substrate is silicon, alumina, sapphire, or an electroconductive metal having a melting point of at least 850° C.

27. The method of claim 26, wherein the substrate is silicon or Pt-coated silicon.

28. The method of claim 22, wherein the substrate contains lithographically patterned or anodically etched pores, zeolites, or aeorogels.

29. The method of claim 22, wherein the substrate is anisotropically etched or locally patterned by laser ablation.

30. A method of preparing a $Ba_aTi_bO_c$ thin film composite wherein a and b are independently between about 0.75 and about 1.25 and c is about 2.5 to about 5.0 which comprises:

A. reacting a glycol with barium oxide under agitation;

B. diluting the reaction mixture of step a with an alcohol;

C. adding titanium isopropoxide to the reaction product of step B with agitation;

D. depositing the mixture of step C. onto a substrate;

E. drying the coating of step D at a temperature of from about 150° C. to about 200° C.; and F. annealing the product of step E. at a temperature of from about 600° C. to about 800° C. until crystallization;

wherein the glycol, barium oxide, alcohol and titanium isopropoxide have a purity of at least 95%; and further wherein steps A through F are conducted in a dry nitrogen-rich atmosphere.

31. The method of claim 30, which further comprises adding an aqueous solution containing Au, Cu, $Ni_3Al$, Ru or InSn to the product of step C prior to the deposition of the mixture onto the substrate wherein the molar ratio of $Ba_aTi_bO_c$:M in the thin film is 1:1 and further wherein the purity of the aqueous solution is at least 95%.

32. The method of claim 31, wherein the solution is of $HAuCl_4$ in alcohol.

33. The method of claim 30, wherein the substrate is silicon, alumina, sapphire, or an electroconductive metal having a melting point of at least 850° C.

34. The method of claim 33, wherein the substrate is silicon or Pt-coated silicon.

35. The method of claim 30, wherein the substrate contains lithographically patterned or anodically etched pores, zeolites, or aeorogels.

36. The method of claim 30, wherein the substrate is anisotropically etched or locally patterned by laser ablation.

* * * * *

UNITED STATES PATENT AND TRADEMARK OFFICE
CERTIFICATE OF CORRECTION

PATENT NO. : 6,432,472 B1
DATED : August 13, 2002
INVENTOR(S) : Mark Farrell, Harry E. Ruda and Yuichi Masaki It is certified that error appears in the above-identified patent and that said Letters Patent is hereby corrected as shown below:

Column 12,
Line 54, delete "compnses" and insert -- comprises --;
Line 55, delete "bahurn", and insert -- barium --;

Column 14,
Line 29, after "preparing a", insert -- MdBaaTibOc --;
Line 30, delete "filhn", and insert -- film --;
Line 44, delete "form", and insert -- from --; and
Line 49, after "alcohol", insert -- , --.

Signed and Sealed this

Seventeenth Day of December, 2002

JAMES E. ROGAN
*Director of the United States Patent and Trademark Office*